United States Patent Office 3,450,115
Patented June 17, 1969

3,450,115
AIR-FUEL RATIO CONTROL DEVICE FOR INTERNAL COMBUSTION ENGINES
Tadahide Toda and Kenji Gotoh, Toyota, and Haruyuki Obata, Higashi-Kamogun, Japan, assignors to Toyota Jidosha Kogyo Kabushiki Kaisha, Aichi-ken, Japan, a corporation of Japan
Filed Apr. 24, 1967, Ser. No. 633,197
Int. Cl. F02m 3/00; F16k 15/06, 31/44
U.S. Cl. 123—119                    4 Claims

ABSTRACT OF THE DISCLOSURE

This invention is designed to maintain a constant optimum air-fuel ratio in the mixture supplied to the combustion chamber of an internal combustion engine from its carburettor by providing an air intake valve in the intake manifold downstream of the throttle valve of the carburettor and connecting this air intake valve with the throttle valve through linkage including a dash-pot so arranged that very little force is transmitted to the air intake valve as the throttle valve is opened but closing of the throttle valve beyond a predetermined point results in temporary opening of the air intake valve, thereby introducing into the manifold an amount of air dependent upon the degree of opening of the throttle valve before it began to shut.

---

In the conventional operation of an engine equipped with a carburettor such, for instance, as the gasoline engine of an automobile, the output is adjusted by opening or closing the throttle valve of the carburettor. If in such operation the throttle valve of the carburettor is suddenly closed, the air-fuel ratio in the intake manifold will be too rich, because the liquid fuel existing in the intake manifold will then undergo accelerated evaporation and gasification by reason of an increase in the negative pressure. As a consequence, the mixed gas in the combustion chamber will burn imperfectly and this will result in the release of a high percentage of noxious ingredients such as carbon monoxide and hydrocarbon in the exhaust gas from the engine. This phenomenon should not be overlooked from the standpoint of air pollution, and will be the more conspicuous, the larger the surface area of the inside wall of the intake manifold and the lower the temperature of the air drawn in. In multicylinder engines with long intake manifolds and in engines with a layout of suction piping in which the air drawn in is heated by the cooling water, the release of carbon monoxide and unburnt hydrocarbons is especially large.

This phenomenon renders the transition from deceleration to idling of the engine transient, thereby hindering smooth operation of the engine. Meanwhile, in the case of an engine running at a constant speed, all the fuel in the intake manifold is not always gasified and mixed with air. Part of the fuel floats as droplets in the mixed gas and part of it flows in contact with the inside wall surface of the intake manifold. To eliminate this liquid portion of the fuel, considerable external heat must be applied to heat the gas drawn in, but this would expand the gas, leading to an output drop due to the decline in the filling rate in the low speed range. For this reason, there is an inevitable limit to heating and accordingly the presence of liquid fuel in the mixed gas has to be tolerated. Usually the amount of this liquid fuel is the larger when the engine load is greater.

The object of the present invention is to provide an air-fuel ratio control device for an internal combustion engine, said device being intended to eliminate the above-mentioned inconvenience in the transition between an operating position and a shut-off position of the throttle valve and to assure constant maintenance of the air-fuel ratio in the mixed gas coming into the combustion chamber at an optimum value, by allowing the air to be continuously drawn into the intake manifold for an appropriate time after the throttle valve of the carburettor has begun to close.

In order to attain the above object, a valve is provided opening downstream of the throttle valve of the intake manifold and accordingly the intake manifold communicates with the atmosphere, via said valve. The operation of said valve is related to the throttle valve through a buffer, so that even in case of sudden closing of the throttle valve, the other valve can be swiftly opened or slowly closed, thereby maintaining an optimum air-fuel ratio in the mixed gas within the intake manifold, and preventing any action of said valve when the throttle valve opens only slightly, thus preventing the air-fuel ratio of the mixed gas in intake manifold from becoming too rich through an abrupt change in the amount of liquid fuel when the engine is suddenly switched from normal operation to one in which the throttle valve is closed.

The details of one embodiment of this invention will now be described with reference to the attached drawing in which.

Figure 1:
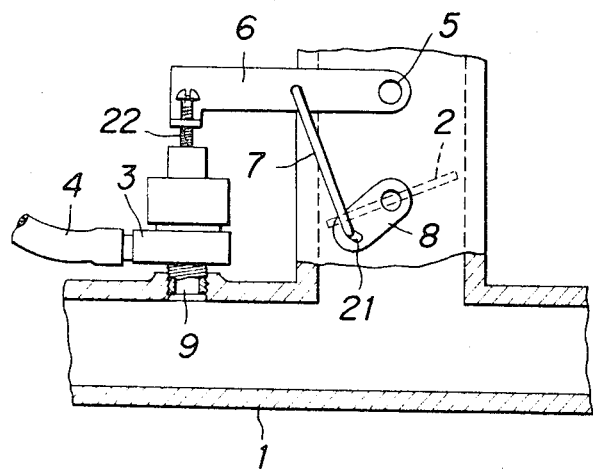
FIGURE 1 is a side view of the device with part of the intake manifold broken away.

In FIG. 1 the valve 3 opens downstream of the throttle valve 2 and is located on the outside of the intake manifold 1. A duct 4 connects the valve 3 to the air filter upstream of the carburettor of the suction device or to a separate air-cleaner in communication with the atmosphere.

The top of said valve 3 is so arranged as to touch one end of an intermediate lever 6 whose other end is pivotally supported by the fixed shaft 5.

The intermediate lever 6 is connected to a metal arm 8 by means of a rod 7. The metal arm 8 is fixed to the movable stem of the throttle valve 2. Said metal arm 8 is connected to said intermediate lever 6 by, say, providing a slot 21 in the arm or attaching said rod 7 to the arm 8 by means of a spring, so as to provide a play within which the metal arm 8 can move to a certain extent without actuating the intermediate lever 6. At the extreme end 22 of the intermediate lever 6, where the moving part of the valve 3 comes into contact with the lever, an adjusting screw as indicated in the drawing may be inserted to permit adjustment of the range through which said intermediate lever 6 can move without actuating the valve 3.

This is an arrangement designed to prevent the response of valve 3 to a slight opening or closing of the throttle valve 2 of the carburettor, i.e., to a slight load variation when it occurs in the relatively low range of engine load, that is, when there is only a small amount of liquid fuel in the intake manifold 1.

Figure 2:
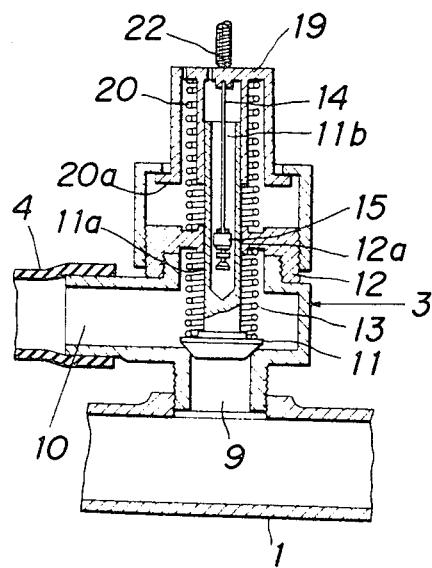
FIGURE 2 is a longitudinal section through the device.
Figure 3:
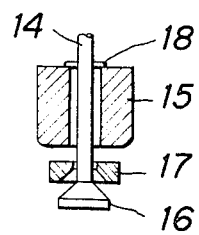
FIGURE 3 shows a longitudinal section of the essential part of the added valve.

The valve 3 has two channels as indicated in FIG. 2: a channel 9 whose lower end opens into the intake manifold 1 and a channel 10 which connects to the air filter under approximately atmospheric pressure. An adapter 12 is screwed on to the top of the valve body 3. A valve seat is positioned between the channel 9 and the channel 10 and a valve member 11 sits on said seat, said valve member opening and closing the orifice connecting the channels 9 and 10. The valve member 11 is normally biased shut by the spring 13 between it and the adapter 12. Moreover, said valve member 11 has a cylindrical portion jutting upward and the outside 11a of said cylindrical portion fits slidably into the hole 12a provided in the adapter 12. The inside 11b of the cylindrical portion is filled with oil and a free piston 15 fitted to a stem 14 hanging from the cap 19 is sealed within the cylindrical portion, thereby constituting an oil-damper which strongly resists downward movement of the valve chamber 11. FIGURE 3 shows the structural details of the stem 14 and the free piston 15. The stem 14 has an enlarged lower end 16, above which an intermediate ring 17 and said free piston 15 are respectively mounted on the stem 14 with a considerable clearance. A stop pin 18 defines the upper limit of a vertical range through which the piston 15 and ring 17 can move freely on the stem 14. The free piston 15 slidably engages the inside wall 11b of said cylinder and the whole thing can be submerged under oil.

Above the adaptor 12 which extends cylindrically toward the top of valve body in the cap 19, the upward displacement of which is restricted by the flange 20a. The cap 19 is supported by the spring 20 between it and the adapter 12. The spring 20 is stiffer than the spring 13 which holds down the valve member.

The operation of the device according to this invention will now be described. As explained above, it is so arranged that the intermediate lever 6 will not cause the valve 3 to act in response to a slight change in the position of the throttle valve 2 of the carburettor. Even if the throttle valve 2 of the carburettor is moved in the opening direction, the valve 3 will not act in rsponse to either opening or closing of the throttle valve until the extent of the opening exceeds a predetermined value, and until this value is exceeded the valve 3 is held closed by the spring 13. But when the opening of the throttle valve 2 of the carburettor exceeds said certain value, the tip of the intermediate lever 6 will, as the throttle valve opens further, push down the upper surface of the cap 19 of the valve 3.

Under this downward pressure, the cap 19 will compress the spring 20 and descend, while at the same time the stem 14 together with the free piston 15 will go down into the oil in the cylinder inside 11b. As said stem 14 drops into the oil, the ring 17 and the free piston 15 will be separated as seen in FIG. 3 from each other, creating a gap around the stem 14 through which the oil can flow. As a result, the stem 14 together with the free piston 15 can now move against diminished flow resistance, while the stop pin 18 on top of the piston 15 is large enough to prevent the escape of the piston 15. Thus, hardly any resistance is offered to the movement of oil and accordingly the free piston 15 can be pressed down against very little resistance within the cylinder 11b, thus keeping the valve member 11 connected to the cylinder continuously closed.

Next, when the throttle valve 2 of the carburettor begins to close, the tip of the intermediate lever 6 will rise and if the cap 19, has been pressed down the pressure on it is lifted, so that it will be forced upward by the spring 20. In consequence, the stem 14 will also rise from its lowermost position. Since the stem 14 has an enlarged lower end 16, the ring 17 and the free piston 15 will come together against the enlarged end 16 to form a block, which almost closes the flow passage around the stem 14. This impedes the oil flow past the free piston 15, so that in order to lift the free piston 15 it will be necessary to overcome the suction force of a vacuum created below this piston; in other words a large resistance is generated in the cylinder inside 11b. On account of this, when the stem 14 rises it will be accompanied by the cylinder of the valve body 11; and at the same time the valve body 11 connected to the cylinder will overcome the force of spring 13 and also rise. As the oil in the cylinder inside 11b flows into the space below the free piston 15, thereby reducing the suction force acting on the free piston 15, the valve body 11 will again shift downward under the action of spring 13, closing the channel 9. In this manner, the valve body 11, after rising to an extent corresponding to the fall of the stem 14 which is proportional to the opening of the throttle valve, will be forced down by the action of spring 13 and gradually drop under the oil-damper action due to the resistance of piston 15 in the oil. In the meantime, the valve member 11 is temporarily moved to its open position and the period during which it is open will depend on the initial opening of the throttle valve. During this period, air will be introduced through the channel 10 into the intake manifold 1, the amount of air introduced then corresponding to the operating condition and being appropriate for maintaining the optimum air-fuel ratio in the intake manifold. The amount of air which should be introduced depends on the temperature in the intake manifold as well as the opening of the throttle valve—the higher the temperature the less the amount of air required. As described above, it is possible by using an oil-damper mechanism to make the reverse action time shorter when the temperature is higher, since the temperature affects the viscosity of the oil. Therefore, the amount of air to be introduced to meet the needs of the engine can be automatically made to match the amount of air to be supplied through the valve. In engines which are not sensitive to temperature, a mechanical buffer may be employed to lower the valve body 11.

As stated above, the application of the device according to this invention to the intake manifold of internal combustion engine will optimize the air-fuel ratio in the over-concentrated mixed gas generated immediately after sudden shutting of the throttle valve, thus ensuring perfect combustion all the time. In consequence the generation of various gases noxious to the human body, such as carbon monoxide can be suppressed, thereby making an invaluable contribution to the control of air pollution and at the same time to the smooth operation and stability of the engine.

What is claimed is:

1. A device for controlling the air-fuel ratio in the intake to an internal combustion engine equipped with a carburettor having a throttle valve, said device comprising an auxiliary air intake duct for connection to said engine intake, an auxiliary valve comprising a valve member in said auxiliary duct, means biasing said valve member toward a position in which it closes said auxiliary duct, means for exerting on said valve member an opening force greater than the closing force exerted by said biasing means, and means for operatively connecting said force exerting means and said valve member to temporarily apply to said valve member the force exerted by said force exerting means and thereby temporarily open said auxiliary valve whenever said throttle valve is moved past a predetermined point toward a closed position.

said connecting means comprising a dash-pot including a cylinder member and a piston member, one of said dash-pot members being fixed to said valve member and the other to said force-exerting means.

2. A device as claimed in claim 1 in which said connecting means comprises lost motion means operatively connecting said throttle valve to said force exerting means.

3. A device as claimed in claim 1 in which said dash-pot is filled with an oil having a viscosity which varies with temperature.

4. A device as claimed in claim 1 in which said force exerting means is a spring more powerful than the resilient means biasing said valve member toward its closed position.

References Cited

UNITED STATES PATENTS

| | | |
|---|---|---|
| 998,355 | 7/1911 | Lee. |
| 1,319,166 | 10/1919 | Morrison. |
| 1,945,603 | 2/1934 | Funston. |
| 2,107,874 | 2/1938 | Parvin. |
| 2,439,573 | 4/1948 | Mallory. |
| 2,506,511 | 5/1950 | Mallory. |
| 3,150,649 | 9/1964 | Hebbard. |

AL LAWRENCE SMITH, *Primary Examiner.*

U.S. Cl. X.R.

261—41.4; 137—480, 481, 482